United States Patent [19]

Burke

[11] Patent Number: 4,798,469

[45] Date of Patent: Jan. 17, 1989

[54] NONCONTACT GAGE SYSTEM UTILIZING REFLECTED LIGHT

[76] Inventor: Victor B. Burke, 1692 Kingsley Ave., Akron, Ohio 44313

[21] Appl. No.: 783,344

[22] Filed: Oct. 2, 1985

[51] Int. Cl.⁴ .................. G01B 11/08; G01B 11/24
[52] U.S. Cl. .................. 356/376; 356/381; 356/385
[58] Field of Search ............ 356/375, 376, 381, 384, 356/385; 250/201; 350/254, 520

[56] References Cited

U.S. PATENT DOCUMENTS

| | | |
|---|---|---|
| 3,491,240 | 1/1970 | Vyce . |
| 3,523,731 | 8/1970 | Mary . |
| 3,523,736 | 8/1970 | Bottomley . |
| 3,601,613 | 8/1971 | Hock . |
| 3,679,307 | 7/1972 | Zoot et al. . |
| 3,740,153 | 6/1973 | Wood . |
| 3,781,115 | 12/1973 | Rader et al. . |
| 3,813,172 | 5/1974 | Walker et al. ............ 350/520 |
| 3,918,814 | 11/1975 | Weiser . |
| 3,918,816 | 11/1975 | Poster et al. . |
| 3,997,715 | 12/1976 | Elliott ............ 250/201 |
| 4,063,820 | 12/1977 | Borgese . |
| 4,079,247 | 3/1978 | Bricot et al. ............ 250/201 |
| 4,088,408 | 5/1978 | Burcher et al. ............ 356/376 |
| 4,152,586 | 5/1979 | Elliott et al. ............ 250/201 |
| 4,276,480 | 6/1981 | Watson . |
| 4,315,688 | 2/1982 | Pryor . |
| 4,349,274 | 9/1982 | Steele . |
| 4,355,904 | 10/1982 | Balasubramanian . |
| 4,373,804 | 2/1983 | Pryor et al. . |
| 4,373,805 | 2/1983 | Mallinson . |
| 4,381,557 | 4/1983 | Jebens ............ 250/201 |
| 4,411,528 | 10/1983 | Newcomb et al. ............ 356/375 |
| 4,429,967 | 2/1984 | Tokuda et al. . |
| 4,465,374 | 8/1984 | Pryor et al. . |
| 4,479,717 | 10/1984 | Cornillault . |
| 4,483,618 | 11/1984 | Hamar . |
| 4,484,854 | 11/1984 | Chitayat . |
| 4,498,778 | 2/1985 | White . |
| 4,502,785 | 3/1985 | Truax . |
| 4,518,257 | 5/1985 | Donaldson . |
| 4,526,471 | 7/1985 | Bykov et al. . |
| 4,547,674 | 10/1985 | Pryor et al. . |
| 4,548,504 | 10/1985 | Morander ............ 356/376 |

FOREIGN PATENT DOCUMENTS

2453392 12/1980 France ............ 356/381

Primary Examiner—F. L. Evans
Attorney, Agent, or Firm—David A. Burge

[57] ABSTRACT

Methods and apparatus are provided for determining spatial characteristics of an object such as the size, shape and relative locations of selected portions of the object, by utilizing a noncontact gage system that directs light from a source such as colliminated a laser beam to illuminate a small area on selected portions of the object. Light that is reflected from the illuminated area is focused along a path that is intercepted by a light sensitive detector. The size of an illuminated spot that is formed on the detector is a function of the location of the reflecting surface portion of the object. An electrical signal is provided by the detector, with the signal having a characteristic which is representative of a feature of spot size, and hence is also representative of the location of the reflecting surface portion of the object. By determining relative locations of various features of an object, size and shape may be deduced. In preferred practice, electronic signal processing is utilized to sample the signal at rapid but regular spatial or timed intervals. Data may be stored and/or analyzed as an incident light beam is moved across selected surface portions of an object to cause the illuminated area to move like a probe to interrogate the object; alternatively, the object surface may move relative to the incident light beam. A microcomputer may be used to control system operation, to compare sensed values with predetermined values to ascertain whether features of the object conform to predetermined tolerances, to determine what additional machining may be required, and/or to monitor and control needed machining.

35 Claims, 4 Drawing Sheets

NONCONTACT GAGE SYSTEM UTILIZING REFLECTED LIGHT

BACKGROUND OF THE INVENTION

1. Field of the Invention

The present invention relates to a noncontact gage system for determining spatial characteristics of an object such as size, shape and/or relative location of selected portions of the object by directing incident light onto selected surface portions of an object to form an illuminated area thereon, and by focusing reflected light from the illuminated area along a path that is intercepted by a light sensitive detector. The detector provides an output signal that is representative of a characteristic of the selected surface portion of the object, typically its location. By determining relative locations of various features of the object, its size and shape may be deduced. The signal from the detector is preferably electronically processed, and values of the processed signal are compared with predetermined values, sampled and/or stored. Stated in another way, the present invention relates to a noncontact sensing and measuring system that utilizes incident and reflected light to interrogate an object, with the system being suitable for making dimensional and geometrical measurements on a wide variety of surfaces and objects. A microcomputer may be used to monitor and control gage operation, to collect and compare data to predetermined desired values, and/or to determine and control needed machining.

2. Prior Art

Industrial metrology is concerned with measuring dimensions, geometry, and surface finish characteristics of manufactured parts. As the study of this science and art has progressed, many types of measuring devices and techniques have evolved to answer recurring questions about desired degrees of conformance of spatial characteristics of objects, for example whether dimensions are within tolerance, total runout is within acceptable limits, surface smoothness is within predetermined specifications, related surfaces are flat and parallel or round and concentric, selected surface portions are properly located relative to each other, and the like.

Despite a continuum of development, a need persists for improved methods and means that will enable selected spatial characteristics of an object to be quickly, easily, and yet accurately ascertained and compared with desired values. A need also remains for an integrated system that has a capability not only to sense, store and compare data about spatial characteristics of objects, but also to determine and control the character of additional machining that is needed to bring spatial features of an object into conformance with desired limits.

SUMMARY OF THE INVENTION

The present invention addresses foregoing needs and other drawbacks of prior proposals by providing a noncontact gage that utilizes light which has been reflected from selected surface portions of an object and focused along a path that is intercepted by a detector which generates a signal that is sampled rapidly to provide data that is stored and/or compared with predetermined values. The data also may be utilized to determine and control the character of additional machining as needed to bring the object into conformance with desired limits.

Stated in another way, the present invention provides to a noncontact gage system for determining spatial characteristics of an object such as size, shape and/or relative location of selected portions of the object by utilizing light that is (1) projected onto selected portions of an object to illuminate a small area, and (2) reflected from the illuminated area, and (3) passed through at least one lens to focus the light along a path that causes an illuminated spot to be directed onto a light sensitive detector. Size characteristics of the illuminated spot formed on the detector are sensed and compared with predetermined values to obtain an indication of such spatial characteristics as the relative positions of the selected object portions. In preferred practice a microcomputer is used to monitor and control gage operation, and to collect and compare data to predetermined desired values. The computer may also be used to determine and control needed machining.

Because the noncontact gage of the present invention utilizes reflected light that is focused along a path to form an illuminated disc-like spot on a surface of a light sensitive detector, relative motion of the object toward or away from the lens that focuses the reflected light causes a change in the diameter of the disc-like spot that is formed on the detector. This is to say that axial motion of the object is converted to transverse motion of reflected light on the surface of the detector. Thus, measuring the diameter of the disc-like spot on the detector allows the location of the reflecting surface of the object to be determined. Moreover, by causing relative movement of the object and the gage, a progressive interrogation is made that causes the size of the disc-like spot to change as the sensed location of the reflected surface changes. By rapidly sampling a signal that is produced by the detector to obtain data representative of the diameter of the disc-like spot, a stream of data is generated that represents sensed changes of location of the reflecting surface.

An advantage of the noncontact measuring system of the present invention is that it does not disturb or disrupt the surface being measured. A further advantage is that the system of the present invention can be configured to accommodate specifications that vary quite widely for various types of applications.

A feature that obtains with the preferred practice of the present invention is that incident and reflected light are utilized to interrogate an object, with both the incident and reflected light being transmitted coaxially by a single system of optics, typically including lenses and mirrors. In preferred practice, interchangeable optical components are provided to equip the system to interrogate a variety of object portions that may be positioned in widely differing locations and orientations.

A further feature of preferred practice resides in the provision and use of a noncontact gage system that is capable of continuously sampling sensed signal information at a high speed, thereby enabling spatial characteristics of an object to be inspected quite rapidly while providing real-time processing that makes possible immediate comparisons of sensed information with predetermined values. Thus, conclusions can be drawn about characteristics of the object even as the object is being examined. Equally immediate determinations can be made regarding what should be done with the object, for example to bring non-conforming features into conformance.

BRIEF DESCRIPTION OF THE DRAWINGS

These and other features, and a fuller understanding of the invention may be had by referring to the following description and claims taken in conjunction with the accompanying drawings, wherein:

DESCRIPTION OF THE PREFERRED EMBODIMENT

Because methods and apparatus that embody features of the present invention can take a variety of forms, this description has been divided into sections, including a first section that describes basic forms and practice of the invention. Other sections treat design factors, considerations, analyses and enhancements that may be utilized in configuring noncontact gage systems of the present invention to meet the needs of particular applications.

1. Basic Form and Practice

Figure 1:
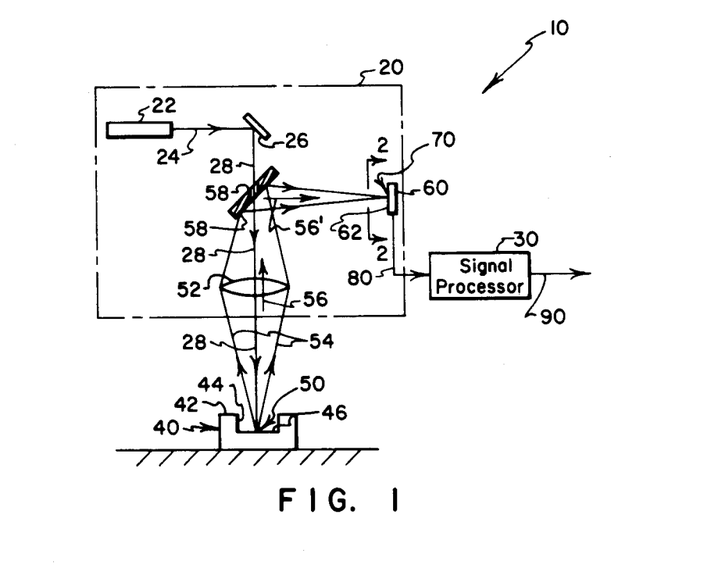
FIG. 1 is a schematic view of a noncontact gage system of the present invention showing the projection of a beam of light onto a surface of an object, and the focusing of reflected light along a path that is intercepted by a light sensitive detector, with the detector providing an electrical signal that is fed to a signal processor.

Referring to FIG. 1, a basic form of noncontact sensor system that embodies features of the present invention is indicated generally by the numeral 10. The system 10 includes a noncontact gage head 20 and a signal processor 30 that cooperate as will be described to use light that is directed onto and reflected from an object 40 to serve as a "probe" to interrogate selected portions of the object 40, to derive an electrical signal 80 that represents information about the object 40, and to process the signal 80 to derive desired data 90 that is stored, displayed and/or promptly utilized.

By way of an overview, the gage head 20 serves (1) to direct incident light onto selected portions of an object 40 to illuminate a relatively small disc-like area 50 thereon, (2) to receive light that is reflected from the illuminated area 50 and to focus this received light along a path that is intercepted by a light sensitive detector 60 (whereby an illuminated disc-like spot 70 is formed on the detector 60), and (3) to obtain an electrical signal 80 from the detector 60 that is representative of at least one spatial feature of interest concerning such portions of the object 40 as have been interrogated by the illuminated area 50.

Also by way of an overview, the signal processor 30 serves to receive the output signal 80 from the light sensitive detector 60 and to "process" the signal 80 to provide desired data 90 (1) by selecting or deriving from the signal 80 a value or values that are believed to be most accurately representative of one or more spatial features of interest, (2) by adding to or subtracting from the signal 80 one or more values that are believed to correct the signal to be more properly representative of one or more spatial features of interest, (3) by sampling the signal 80 (or a signal derived therefrom) at selected intervals of time (or selected spatial intervals) to obtain a series of values that represent data concerning one or more spatial feature of interest, (4) by comparing the signal 80 (or a derivation thereof) or data derived therefrom with predetermined values to detect compliance and non-compliance therewith, and/or (5) by outputting the resulting data 90 for storage, display or further utilization.

The gage head 20 includes an optical transmitter 22 that functions to provide a source of light that is directed toward the object 40 for illuminating a small disc-like area 50 on selected portions of object 40. As depicted in FIG. 1, the object 40 includes an upwardly facing surface 42 that has an upwardly opening groove 44 formed therein. The groove 44 has an upwardly facing bottom surface 46, portions of which are being interrogated by the illuminated area 50.

The source of light that forms a part of the optical transmitter 22 is depicted in FIG. 1 as providing a colliminated laser beam 24 that is reflected by a mirror 26 to travel along a path 28 toward the object 40 to form the illuminated area 50 thereon. However, it will be understood by those skilled in the art that the light source 22 may take forms other than a laser, and that the incident light utilized to form an illuminating area 50 on selected surfaces of the object 40 need not be a colliminated laser beam 24. Factors involved in selecting a suitable light source for a particular application are discussed in a section that follows, entitled "Design Factors and Considerations."

In preferred practice, the light source 22 is a commercially available laser that provides a light beam 24 having a diameter of between about 0.010 and 0.020 inches. One such light source is a helium neon laser that is sold by Spectra-Physics, Laser Systems Division, 959 Terry Street, Eugene, Oreg. 97402 under the designation "Model 007."

Referring still to FIG. 1, it will be seen that the laser beam 24 follows a path 28 in traveling from the mirror 26 to the object 40. The path 28 passes through the optical center of a lens 52. The lens 52 is provided not for purposes of optically affecting the laser beam as it travels along the path 28, but rather is utilized to receive light 54 that is reflected from the illuminated area 50, and to focus this received light along a path that has a first portion 56 which extends from the lens 52 to a mirror 58, and a second portion 56' that extends from the mirror 58 to where it is intercepted by the detector 60. The mirror 58 has a small centrally located opening 58' formed therethrough to permit passage of the laser beam as it moves along the path 28, whereby the incident and reflected light that is utilized to interrogate the object 40 is advantageously coaxial in relative orientation, i.e., incident and reflected light travel to an from the object 40 along a common travel path. Because the laser beam 24 travels through the optical center of the lens 52 as it executes this coaxial path of travel, the lens 52 does not deleteriously affect the character of the laser-generated light from the source 22.

While the lens 52 is depicted as constituting a simple one-piece lens element, it will be understood by those skilled in the art that lens systems of a wide variety of configurations, some of which are "complex" in that they include a plurality of lenses (not shown), can be substituted for the lens 52 to give the system 10 a capability to direct light onto and receive reflected light from object portions that are positioned in almost any location and at almost any orientation relative to other components of the gage head 20. Moreover, because many conventional lens systems will enable a light beam from a source 22 to travel through the optical centers of the various lenses that are utilized to focus reflected light along a path toward the detector 60 without deleteriously affecting the incident light that forms an illuminated area 50 on selected portions of an object 40, it is usually possible for the advantageous coaxial arrangement of paths of travel for incident and reflected light to be maintained. (In some applications, the lens 52 may affect the laser beam as the beam travels along the path 28; this would be due to subtle reasons involving the reflectivity of the object 40.)

Figure 6:
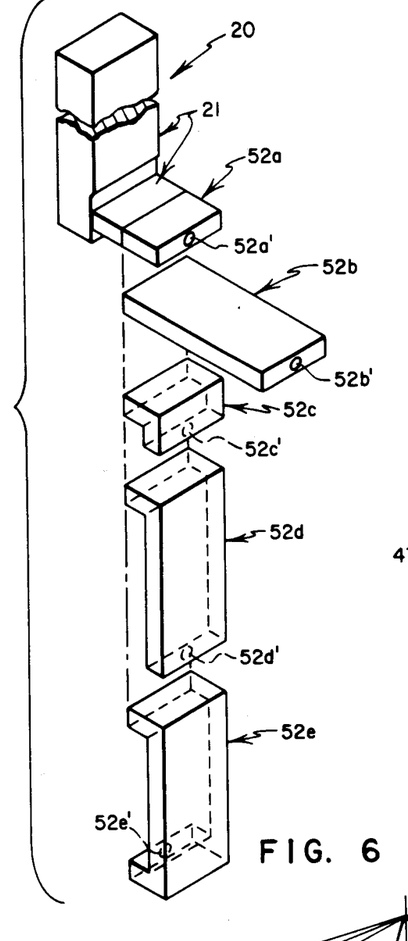
FIG. 6 is an exploded perspective view depicting a plurality of interchangeable optical units that may be utilized to direct incident and reflected light to and from selected surface portions of an object to interrogate surface portions that are positioned in a variety of locations and orientations.

Referring briefly to FIG. 6, a plurality of interchangeable optical units 52a, 52b, 52c, 52d and 52e are provided for use with a body structure 21 that houses other components of the gage head 20. A suitable conventional means of connection (not shown) is used for alternately coupling the optical units 52a, 52b, 52c, 52d and 52e to the body 21. In preferred practice, a conventional robotics system (not shown) is provided for interchanging the optical units 52a, 52b, 52c, 52d and 52e so that needed interrogations of selected surfaces portions of an object (as they may be variously positioned and oriented) can proceed rapidly under automated control. The optical units 52a, 52b include suitable conventional lenses (not shown) for directing incident light to form a relatively small, disc-like illuminated area on selected object portions, and for receiving reflected light through a viewing window 52a', 52b', respectively, and for focusing such received light along a path that is intercepted by a detector 60 as has been described. Likewise, the optical units 52c, 52d and 52e include suitable conventional lenses and mirrors for directing incident and reflected light to and from selected object portions through viewing windows 52c', 52d' and 52e', respectively. The viewing windows 52c' and 52d' face downwardly, while the viewing window 52e' faces leftwardly as viewed in FIG. 6.

Figure 7:
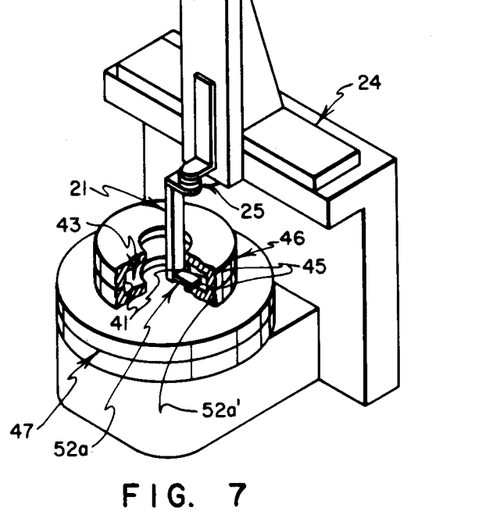
FIG. 7 is a schematic, perspective view depicting a manner in which components of the noncontact gage system of FIG. 1 may be arranged in a practical application wherein the system is utilized to interrogate interior surface portions of an annular structure of the general type that is employed in the molding of circular objects.

A typical use of a specially configured form of the noncontact gage 20 is depicted in FIG. 7 where the gage 20 is connected by a rotary index unit 25 to precision motorized positioning tables 23, 24 that enable the viewing window 52a' of the optical unit 52a to be positioned for viewing interior wall portions 41 and outer diameters 45 of a cylindrical structure 46 that is indicated generally by the numeral 43. Such an arrangement may be utilized to inspect relatively complex surface formations (not shown) that are provided on the radial and axial wall portions 41 for forming molded, cast or machined objects. Similarly, other cylindrical structures can be inspected such as vehicle tires, turbines, camshafts, and the like. As depicted in FIG. 7, the body 21 which houses other components of the detector head 20 is supported on precision motorized tables 23, 24 that are movable vertically and horizontally to aid in positioning the viewing window 52a'. Additionally, a motorized positioning unit 25 is incorporated between the body 21 and the optical unit 52a to rotate the viewing window 52a' about a vertical axis to enable inspection of the inner wall portions 41 or the other diameters 45. In such a system, the object being inspected, namely the cylindrical structure with complex surface formations 41, 45, is supported on a rotary table 47 that is capable of rotating the cylindrical structure 46 about a vertically extending axis. These various relative movements are preferably controlled by a microcomputer and/or a conventional CNC positioning system that is programmable to executed desired movements in an automated manner.

Figure 2:
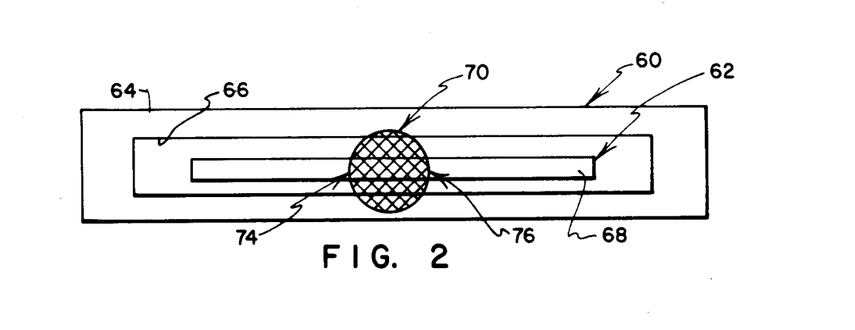
FIG. 2 is a side elevational view, on an enlarged scale, of the light sensitive detector, as seen from a plane indicated by a line 2—2 in FIG. 1.

Referring to FIGS. 1 and 2, the detector 60 provides what will be referred to as a light sensitive detector surface 62 that is preferably oriented to extend in a plane that is substantially orthogonal to the path portion 56'. Light that has been reflected from the illuminated area 50, received by the lens 52, and focused along the path portions 56, 56' is incident on the detector surface 62 and forms the disc-like spot 70 thereon.

Figure 8:
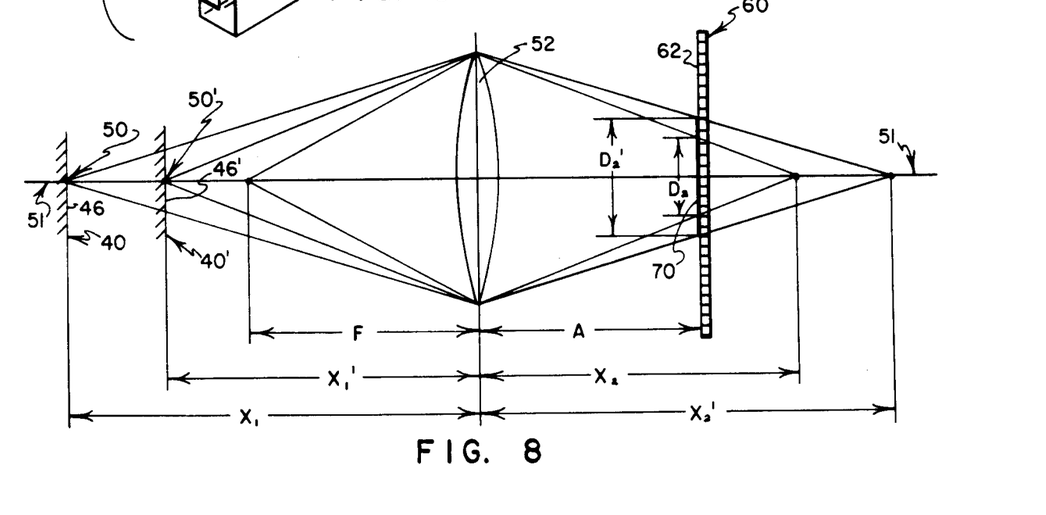
FIG. 8 is a schematic diagram depicting, in a simplified form, various inter-relationships associated with system optics that are utilized to focus reflected light from selected portions of an object along a path that is intercepted by a light sensitive detector.

The diameter of the disc-like spot 70 that is formed on the detector surface 62 is a function of the distance from the lens 52 of the surface portions of the object 40 that are being interrogated by the illuminated spot 50. Referring to FIG. 8, the lens 52 is depicted as having a center optical axis 51. The distance $X_1$ from the lens 52 to the illuminated spot 50 is shown as being greater than the focal length F of the lens 52. Light radiating from the spot 50 and incident on the lens 52 is imaged at a distance $X_2$ which is greater than the focal length F. As the illuminated spot 50 moves toward the lens 52 to a position designated by the numeral 50', the distance $X_1$ decreases to $X_1'$; and, the distance $X_2$ increases to $X_2'$ as the image of the spot 50 recedes from the lens 52 (i.e., moves rightwardly along the axis 51). The detector 60 is inserted at a selected distance A from the lens 52, with the distance A being less than the distance $X_2$ so that the detector 60 will intercept the converging beam of focused light, resulting in an illuminated area 70 of diameter $D_2$ on the detector surface 62. As will be apparent from what is depicted in FIG. 8, the diameter $D_2$ of the illuminated area 70 increases to the diameter $D_2'$ as the distance from the lens 52 to the object 40 is decreased as it is displaced rightwardly along the axis 51 so that the illuminated spot 50 moves from position $X_1$ to position $X_1'$ where it is designated by the numeral 50'. Thus, the diameter $D_2$ of the spot 70 that is formed on the detector surface 62 is a function of the relative positions of the illuminated spot 50 and the lens or lens system 52 that is used to direct light onto and receive light from selected portions of an object 40. While diameter $D_2$ of the spot 70 is also a function of the relative positions of the detector surface 62 and the lens 52, the effect of this variable is essentially eliminated by holding constant the distance A from the detector surface 62 to the lens 52.

Because the noncontact gage of the present invention utilizes reflected light that is focused along a path to form an illuminated disc-like spot 70 on a surface of a light sensitive detector 60, relative motion of the object 40 towards the lens 52 that focuses the reflected light causes a change in the diameter of the disc-like spot 70 that is formed on the detector 60. This is to say that axial motion of the object 40 is converted to transverse motion of reflected light on the surface 62 of the detector 60. Thus, measuring the diameter of the disc-like spot 70 on the detector 60 allows the location of the reflecting surface 46 of the object to be determined. Moreover, by causing relative lateral movement of the object 40 and the gage 20, a progressive interrogation is made that causes the size of the disc-like spot 70 to change as the sensed location of the reflected surface 46 changes. By rapidly sampling a signal 80 that is produced by the detector 60 to obtain data representative of the diameter of the disc-like spot 70, a stream of data is generated that represents sensed changes of location of the reflecting surface.

The detector 60 can take a variety of commercially available forms, e.g., it can take the form of a television camera tube, it is preferred to use a commercially available detector of the type that includes a self-scanning linear photodiode array, whereby a signal 80 that is derived from the detector 60 includes pulses, each of which varies in magnitude with time to represent a sequential reading of the intensity of light that is incident on such pixels as are provided along the array that defines the detector surface 62. One such detector is sold by EG&G Reticon, 345 Potrero Avenue, Synnyvale, Calif. 94086 under the model designation G-256, also referred to as a "G-Series Sensor" that has an array of 256 elements located at on-center distances of about 25 micrometers. Referring to FIG. 2, such a detector 60 has an outer protective casing or enclosure 64 that defines a generally rectangular window 66. A light sensitive detector surface 68 of elongate configuration is viewable through the window 66. An illuminated spot 70 is shown formed on the detector 60.

Figure 3:
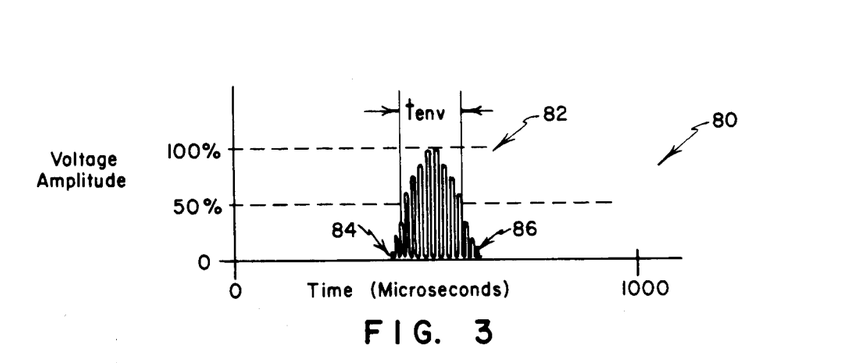
FIG. 3 is a schematic representation of pulses of an electrical signal that are provided by one scan of the light sensitive detector.

Referring to FIG. 3, one pulse group per scan of the type that is provided in the electrical output signal 80 of the detector 60 is indicated generally by the numeral 82. The pulse group 82 begins, as is indicated by the numeral 84, at a time that is representative of the relative position of an edge 74 of the illuminated spot 70 as depicted in FIG. 2. The magnitude of the pulse group 82 varies with time as the result of sensed magnitudes of the intensity of the illuminated spot 70 as detected by the elements of linear array of the detector 60. The pulse group 82 ends, as is indicated by the numeral 86, at a time that is representative of the relative position of an edge 76 of the illuminated spot 70 as depicted in FIG. 2.

Electronic signal processing is desirably utilized to measure the diameter of the disc-like spot 70 that is formed on the detector 60. With electronic processing, the diameter of the disc-like spot 70, a spatial quantity, is converted to an electrical gating pulse, as is indicated by the numeral 145 in FIG. 4. A controller for the self-scanned photodiode array of the detector 60 is not shown or described, for it is a commercially available unit that is purchased with the detector 60 that has been selected for use in a particular application or is built from a circuit plan that is provided by the vendor of the detector 60. Such a controller works with the photodiode array to assure that the output signal 80 of the detector 60 is of the basic type that is described herein. In overview (a detailed description of the operation of the processor 30 follows shortly), the height of the pulse 145 is constant but the pulse width, a temporal quantity, is proportional to the diameter of the disc-like spot 70. In the processor 30, a time to digital conversion takes place. A value representing the largest distance between the object 40 and the gage 20 is loaded in a counter. Clock pulses are permitted to pass through a gate as long as the gate pulse holds the gate open. Each clock pulse decrements the value in the counter by one count. When the gate closes, the value in the counter represents the distance between the gage and the part. Through a look-up table or through a calculation, the value in the counter is converted to a displacement in inches or in millimeters.

Figure 4:
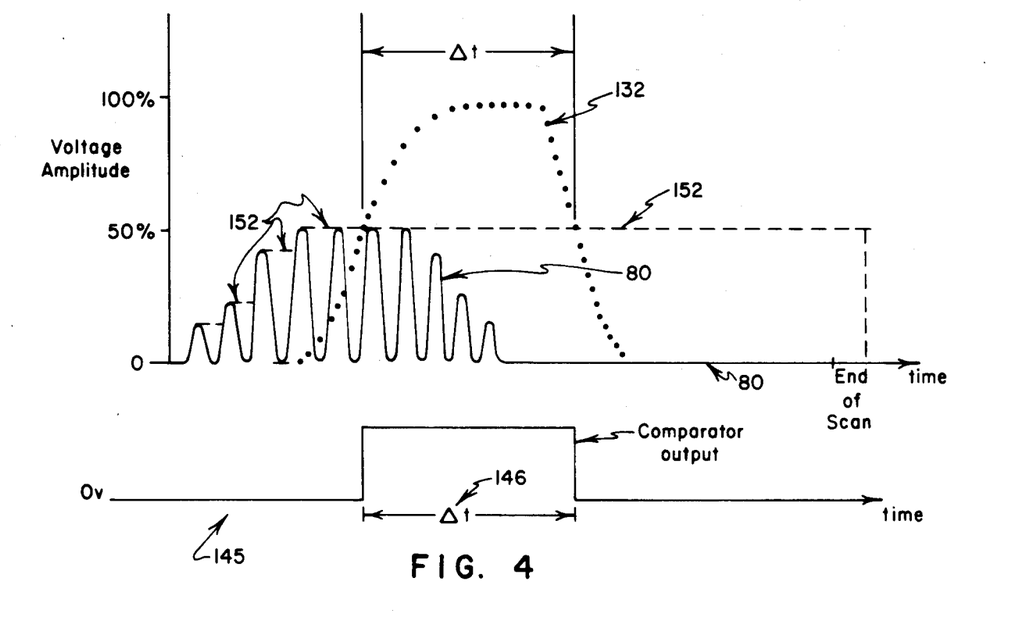
FIG. 4 is a schematic view representative of the manner in which an output electrical signal from the light sensitive detector is treated in order to provide a signal that includes pulses that each are representative of a sampled value of the electrical signal from the light detector.
Figure 5:
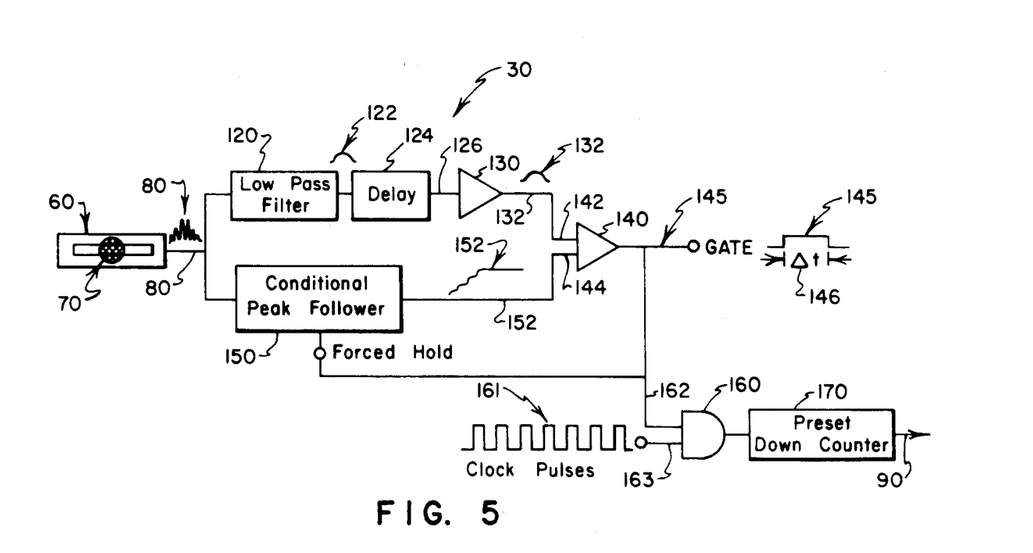
FIG. 5 is a schematic block diagram of an arrangement of electrical components that forms a signal processor which is utilized to treat the output electrical signal from the light sensitive detector.

Referring to FIG. 5, the signal processor 30 includes a low pass filter 120 which extracts the envelope of the photodiode array signal 80, and serves to delay the transmission of the resultant signal 122. The delay is a subtle but significant factor; it is indicated schematically in FIG. 5 by he numeral 124. An amplifier 130 is provided to amplify the delayed signal 126 to approximately twice the maximum amplitude of the photodiode signal 80. The amplified signal 132 is delivered to one input terminal 142 of a comparator 140. Waveforms associated with the operation of the these components are depicted in FIG. 4.

Referring again to FIG. 5, a fast sample and hold circuit is indicated generally by the numeral 150. The circuit 150 is controlled by logic signals, making it a conditional peak follower. When enabled, the circuit 150 operates as a peak follower, i.e., the output 152 of the circuit 150 is equal to the peak value of the input signal which is the signal 80 from the detector 60. When disabled, the output 152 is held constant at the current value. The output 152 of the conditional peak follower circuit 150 is applied to a second input 144 of the comparator 140.

When the signal 80 from the photodiode array 60 arrives at the input to the conditional peak follower circuit 150, the output signal 152 follows the input 80, rising to the top of the first pulse. Then as the input drops to prepare for a portion of the signal 80 that is generated by the next-to-report one of the photodiodes in the array that forms the detector 60, the peak follower circuit 50 holds steady at a value equal to the peak of the first pulse. If the next-received pulse of the input signal 80 exceeds the peak of the previous pulse, the output 152 again starts to rise, following the input 80 to the top of the newly received pulse. As is indicated in FIG. 4, the output 152 of the peak follower raises to its highest value during the fourth pulse.

Soon after, the delayed and amplified envelope signal 132 exceeds the peak follower output 152 and trips the comparator 140. The resulting logic signal forces the conditional peak follower circuit 150 into a hold state, establishing a reference value which is equal to 50% of the amplified peak height of the envelope 132. The logic signal 145 remains active as long as the envelope 132 remains above the 50% level. When the envelope 132 drops below that level the comparator output 145 is reset and the conditional peak follower 150 is released to function normally. By that time though, the signal 80 from the photodiode array 60 is less than the peak follower output 152, so the peak follower output 152 remains steady.

It is the duration 146 of the logic signal 145 from the comparator 140 which correlates with the diameter $D_2$ of the illuminated disc-like spot 70 (as has been discussed in conjunction with FIG. 8) and, therefore, with the location (distance $X_1$) of the object 40. Conversion of this time interval 146 to a digital value is a straightforward matter. When the comparator output 145 is active, clock pulses 161 pass through the AND gate 160 and decrement a preset down counter 170. When the object surface portions 46 that are being interrogated are far from the gage head 20, the illuminated disc-like spot 70 at the detector 60 is small, and the gate pulse width 146 is short, so comparatively few clock pulses 161 get through the counter 170, resulting in a large count. Conversely, when the object surface portions 46 that are being interrogated are nearer to the gage head 20, the illuminated disc-like spot 70 is larger, the gate pulse width 146 is greater and more clock pulses 161 get through to the counter 170, giving a smaller count. The ending count represents the distance $X_1$ between the lens 52 and the surface 46 of the object 40.

The comparator output 145 is the gating signal; its duration is a time interval value 146 which correlates with the diameter $D_2$ of the disc-like spot 70, and hence with the object distance $X_1$. This time interval 146 is independent of the amplitude of the signal 80 from the photodiode array 60 (within the linear range of the detector). Referring to FIG. 4, if the intensity of light incident on lens 52 were to double, then all of the voltage waveforms would double in amplitude. But this would have no effect of the comparator output 145, since the two instants in time when the delayed and amplified envelop signal 132 crosses the peak follower output 152 would not change. In other words, the signal processor 30 will operate in a reliable and consistent manner even though the amount of light incident upon detector 30 may change appreciably. However, if the incident light were so intense as to cause saturation in any component of the signal processor 30, distorting one or more waveforms in FIG. 4, or were so dim that a minimum required threshold is not exceeded, then the time interval 146 of the comparator output 145 may not accurately represent the position of the object 40. For reliable, accurate, and consistent operation, the intensity of light and resulting voltage waveforms must fall within the linear range of the components of the signal processor 30.

Another logic signal is required to operate the conditional peak follower 150. at the end of each scan, during a brief latency interval when the photodiode array signal 80 is always zero, the sample/hold circuit samples the zero input, resetting the peak follower 150.

In preferred practice, the output signal 90 of the signal processor 30 is fed to a microcomputer (not shown) for storage, for comparison with predetermined values, and/or for giving the microcomputer the information it needs to determine the type of further machining that is required to bring the inspected object 40 into conformance with predetermined requirements.

The use of a microcomputer lets the system 10 achieve a desired level of automation. In a simple form of practice, the system of the present invention takes the form of a gage that may be manually positioned very much like a conventional dial indicator to sense and measure features of an object without physically touching the object. In a more complex form of practice, a noncontact gage that is automatically positioned by a multi-axis CNC system, such as has been described in conjunction with FIG. 7.

With the present invention, very rapid measurements are possible because the incident light beam may be regarded as a "probe tip" that has the capability to readily follow sudden changes that are defined by surface portions of an object that are being measured. Unlike a mechanical measuring device such as a dial indicator or an electronic displacement gage, there is no need to interrupt the measuring process to lift the probe tip over an obstacle, or to slow down the motion of the part because the probe is failing to precisely follow surface configurations as by "bouncing." The noncontact gage is a transducer that preferably remains stationary, and that has no moving parts. Only the light beam moves as it follows the shape of the object. The gage converts motion of the object that is being studied to an electronic signal by ensing reflected light.

High speed combined with automatic recording of measured values overcomes limitations of traditional measuring devices, such as dial indicators and electronic displacement gages. Furthermore, where the noncontact gage is controlled through a microcomputer, measured values may be analyzed and displayed graphically, "go/no-go" criteria may be evaluated, and concise reports may be provided.

Since a given part may be measured at various stages of production and assembly, a variety of differing measurement tasks may be needed. It is possible for a microcomputer to program the CNC controller based upon a minimal description of the part and on a description of the measurements to be performed during a particular task. With two or more degrees of freedom, the microcomputer can position the gage at a preselected location that is optimum for the particular inspection task to be performed.

Completely automated measurements are possible when the part is mounted on a standard carrier such as a pallet. With the arrangement depicted in FIG. 7, a CNC system is provided for measuring such spatial features of an annular object as inner diameter, outer diameter, and axial dimensions at various diameters and heights. In the arrangement of FIG. 7, the object under inspection is positioned atop a standard carrier such as a pallet which, in turn, is clamped to a rotary table. In operation, the pallet arrives and is identified. The pallet-carried part is rotated about a predetermined rotary axis at a constant RPM. Measurements are made. Rotation is stopped. The pallet-carried part is discharged.

By referring to a data file for each part that is to be inspected, a microcomputer can program a CNC controller, which then moves the linear and indexing tables to position the noncontact gage 20. Between sampling times when measurements are taken, the microcomputer can be utilized to calculate needed derivative data such as average diameters, T.I.R., and concentricities. Out-of-tolerance conditions are reported to a repair station. If all measurements are found to be within specifications, a final report is generated which documents the essential characteristics of the part.

In an integrated manufacturing environment, a network for communication among hierarchial computer systems is provided. To tax the network as little as possible, unnecessary and redundant data should not be transmitted. Only a minimal description of the job should be sent to the measuring system's microcomputer. The microcomputer then does what must be done to exact needed calculations from the minimal data description, or to develop such information as may be needed to complete the assigned measurement tasks.

2. Design Factors and Considerations

The source of light that forms a part of the optical transmitter 22 may take any of a wide variety of forms including a laser, a light emitting diode, an incandescent lamp, or the like. Because these and other types of sources each have various strengths and weaknesses insofar as features of a particular light source may be related to the requirements of a particular application, it is not possible to state that a light source of one particular type is "preferred" for all, or even a majority, of uses for which the system 10 may be employed. Thus, while the source 20 is depicted and will be described herein as providing a colliminated laser beam 24 that is reflected by a mirror 26 to travel along a path 28 toward the object 40 to form the illuminated area 50 thereon, it will be understood by those skilled in the art that other light sources for forming an illuminating area 50 on selected surfaces of the object 40 may be utilized.

Refinements and the needs of certain applications call for a noncontact gage system which is more complex in certain respects that has been described above. For example the single lens 52 shown in FIG. 1 may replaced by a corrected lens system. Prisms, mirrors, and a spatial filters may be utilized in the optical units of the type depicted in FIGS. 6 and 7. The use of an iris, which effectively determines the working diameter of the lens (more precisely, the f-stop number of the lens) may be desired in some installations. A cylindrical lens may be included in some systems to give an oval form to the disk-like spot 70 that is projected into the detector 60 to intensify the light on detector surface 68, the active sensing area.

There are two groups of parameters which are important to the basic form of the non-contact gage. A first group includes "Resolution," "dynamic range," "standoff distance," and "aspect ratio" which are interrelated. A second group includes the number of pixels, the rate at which measurements may be performed, and the brightness of the light source.

"Resolution" is the least displacement of the object 40 that can be detected by the noncontact gage 20. "Sensitivity" and "resolution" are synonymous; a resolution of 0.001 inches means that the sensitivity of the system is 0.001 inches. A system with 0.0005 inch resolution is said to have "higher" resolution than a system with 0.001 inch resolution. In general, the closer that the object 40 is to the front focal point of the lens 52, the higher the resolution.

"Dynamic range" is the maximum displacement of the object 40 that can be detected by the noncontact gage 20. Generally, a system with smaller range would have higher resolution. However, by suitable placement of the detector 60 relative to the lens 52, the dynamic range may be extended for which the resolution is higher than a specified value. The dynamic range must be greater than the depth of a hole, slot, or bottom of a corner which is to be measured.

"Standoff distance" is the minimum distance between the object 40 and the lens 52 for which a measurement is possible. If there are irregular features of the surface 46 of the object 40, such as with molds and castings, then the standoff distance should be large enough to avoid physical contact between the object 40 and the optical unit 52a, for example. "Aspect ratio" is the standoff distance divided by the diameter of the lens 52. If the noncontact gage is to measure the bottom of a hole or a slot, the aspect ratio must be greater than the ratio of slot depth divided by slot width (or hole depth divided by diameter). Also, the aspect ratio determined how near to the side of a shoulder or corner the gage can approach to measure.

The second group of interrelated parameters will now be discussed, namely the number of pixels, the rate at which measurements may be performed, and the brightness of the light source.

It's helpful to think of the detector as a collection of cells or pixels. The word "pixel" is a contraction of "picture element." Fundamentally, measurement rates are limited by the rate at which light enters the pixels. Exposure of a pixel is the product of light intensity and time, just as is the case with the exposure of film in a camera. To provide useful information, the pixels must be neither underexposed nor overexposed.

Low light levels mean slow measurements. It may be that the surface of the part absorbs much of the incident light or that the gage aspect ratio is too large for the application. If the standoff distance is large and the lens diameter is small then comparatively less light enters the detector. There are two things that can be done to boost the amount of available light and thereby make more measurements per second. Use a brighter light source and use the smallest acceptable aspect ratio. A more sensitive detector may also be necessary.

Doubling the speed of measurements means that the time available to collect the light is halved. To maintain a moderately uniform exposure the amount of light entering the detector should be doubled. Similarly, to double the range/resolution ratio means that twice as many pixels are available. If the exposure is to remain constant then, once again, the amount of light entering the detector should double. As more light is needed a brighter light source may be necessary.

In a majority of applications it is desirable for the beam 24 from the light source to have a small diameter (typically within the range of about 0.010 to about 0.020 inches) with very little divergence, such that the spot or disc-like area 50 that is illuminated on the object 40 has a correspondingly small diameter (of typically about 0.010 to about 0.020 inches). However, the size of the illuminated spot or area 50 is a design parameter that can be tailored for the particular application. An objective to be kept in mind in the selection of a light source and of the optical components that are used to transmit light from the source 22 to the object 40 is to assure that the diameter of the spot or area 50 that is formed on the object 40 remains substantially constant over the range of measurement. What is meant by the expression "over the range of measurement" refers to the range through which the feature or characteristic that is being interrogated can be expected to vary during the course of such interrogations as will be conducted of the object 40. If, for example, the system 10 is provided for the purpose of ascertaining the depth of the groove 44 formed in the upwardly facing surface 42, and if the maximum groove depth that will be encountered is three inches, then it is important that the diameter of the area 50 remain constant regardless of where within the three inch range of measurement the system 10 may cause the beam from the source 22 to be incident on the object 40.

In some applications it is advantageous to insert a beam expander (not shown) along the path 28 so that a relatively large diameter beam is provided to the lens 52, and the lens 52 then operates to form a convergent bundle of light rays focusing toward the object 40 for producing the illuminated area 50. By this arrangement, two intrinsic characteristics of a laser beam, namely its diameter and lack of divergence may be altered to better suit a particular application. The convergent light that results from this modification passes through an "extended focus" that is characterized by a "waist diameter" and a "waist length" (a convergent-divergent form that is similar in shape to the neck of an hourglass), and then diverges. In applications of the present invention that utilize convergent light, the measurement range (the range within which measurement can be taken on the object 40) lies within and is equal to the waist length, for in the region of the waist length, the diameter of the illuminated area 50 on the surface 46 of object 40 is essentially constant. Two applications are now described, each taking advantage of one feature of convergent light.

The waist diameter of a convergent-divergent focus pattern is smaller than the intrinsic diameter of the original laser beam (the beam 24 from the source 22) by the factor of the beam expander, i.e., a "times five" beam expander followed by a convergent lens produces a convergent-divergent focus pattern that has a waist diameter that is one fifth the size of the original laser beam. If a curved portion of a relatively small object is positioned within the waist length for interrogation by the focused beam, the illuminated area 50 that is formed on a surface of the small object (assuming that the object portion being interrogated has a small radius of curvature) would be bounded by two parallel planes separated by a distance which is small compared to the measurement tolerance. In other words the illuminated area 50 would be practically flat and thus would allow the small curved part to be measured accurately.

The convergent light may be pictured as a bundle of light rays coming from different directions but heading toward a common region. This is just what is needed to measure the position of a specular reflecting object, i.e., an object that tends to reflect incident light quite directionally like a "perfect" mirror. The converging light rays when reflected simulate a diffuse type of reflection. Some of the reflected light returns to lens 52 (even if the lens 52 is not oriented exactly as would be needed to receive reflected light if the incident beam were comprised of parallel rays) and is therefore capable of providing a measurement. Stated in another way, a focused beam may be used to overcome some types of "alignment" problems that might tend to pose difficulties if an interrogating beam of parallel rays were employed.

Another consideration with regard to spot size is a consequence of the relative transverse motion between the part and the noncontact gage. Suppose that the spot size is 0.010 inches, that 1000 measurements per second are being taken, and that the relative transverse speed is 50 inches per second. With an exposure time of one millisecond, the spot illuminates a strip on the part which is 0.010 inches wide and 0.050 inches long (0.25×1.25 mm). The gage, in effect, is not measuring the distance to a single point on the part but is measuring the average distance to a collection of points. The degree to which this is of any consequence depends upon the application. Decrease the transverse speed or increase the measurement rate, either one will reduce the length of the strip associated with each reading.

All noncontact gages that utilize reflected light as their sensing media have limitations that are dependent on characteristics of the surface portions of the object being examined. Important surface characteristics are the degrees to which the surface absorbs and reflects light, the surface finish including roughness and irregularities, and the tilt of the surface. Two ways to overcome problems of light absorption are to select a brighter light source or one with a wavelength that tends not to be absorbed by the surface. The role played by surface finish and surface tilt will be discussed briefly in the following paragraphs.

Figure 9:
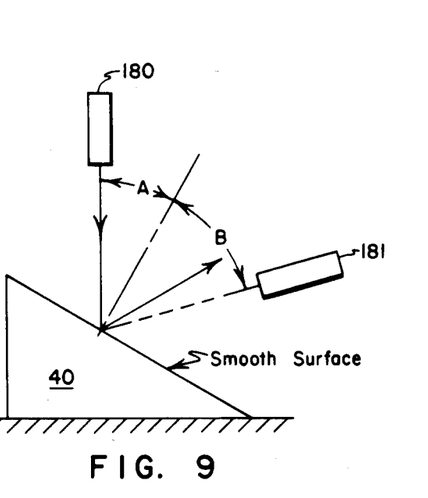
FIGS. 9 and 10 are schematic representations of the use of light to interrogate relative smooth and rough surfaces, respectively.

Suppose that a small spot on the surface of a measured part is illuminated. If the surface is mirror-like, then the angle of incidence of a light ray equals the angle of the reflected ray. This familiar type of reflection is called specular reflection. As illustrated in FIG. 9, with the light source 180 positioned as shown, the detector 181 would have to be at a particular angle to see the reflected light. Naturally, if reflected light never enters the detector 181, then displacement measurements would be impossible.

Figures 10, 11:
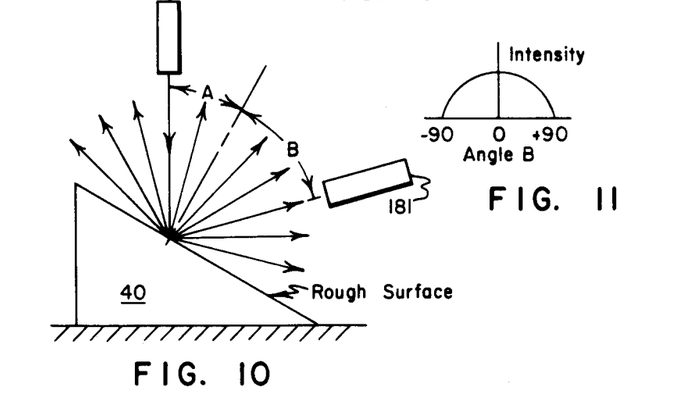
FIG. 11 is a graph showing a relationship between intensity of detected light and the positioning of a light sensitive detector relative to a light source and the plane of a surface portion that is being interrogated; and, FIG. 12 is a schematic representation of various positions of a noncontact gage head that utilizes light to interrogate curved surface portions of an object.

On the other hand, a "rough" surface causes diffuse reflection. Any surface which does not give a reflected image is "rough." Common examples are surfaces having a "satin" finish, such as the barrel of a micrometer, cast parts, even pieces of paper. As illustrated in FIG. 10, diffuse reflection results in an incident light ray being scattered in all directions in the hemisphere above the part, with brightness of the reflected light being non-uniform at all angles. For what is known as a Lambertian surface, the intensity of reflected light is proportional to the cosine of the angle as measured from a line that is normal to the surface, as is depicted in the graph of FIG. 11.

Light reflected from the surface of a manufactured part tends to be partly sepcular and partly diffuse. Most of the light from the source enters the detector when specular reflection dominates. From the detector's viewpoint, the small illuminated spot looks very bright. In contrast, with diffuse reflection the detector receives only a small part of the available light, so the spot looks relatively dim. If, however, "dim" light is sufficient for the detector to operate, then, when reflection is mostly specular, a smaller, lower power, more economical light source may be employed.

When it comes to measuring curved or tilted surfaces, diffuse reflection is very forgiving while specular reflection is not. Tilting the surface of a diffuse reflector (without changing the distance) alters the amount of light which enters the detector. Accurate displacement measurements are still obtainable if the detector is relatively insensitive to variations of light intensity and as long as the incident light exceeds a minimum threshold. The maximum tilt angle for which the distance of the part may be measured depends upon the degree of diffuse reflection from the surface of the part.

Figure 12:
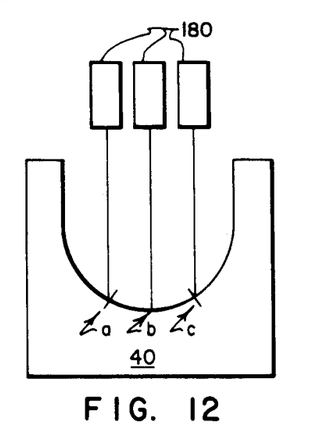

Consider the curved surface depicted in FIG. 12. When a noncontact gage is positioned opposite point "a," the incident beam is at +30 degree angle relative to the surface normal; at "b" the incident beam is normal to the surface; at "c" the beam is at −30 degrees relative to the surface normal. With diffuse reflection, light will enter the detector of the gage in each case and measurements may be obtained. With specular reflection, only reflection at point "b" can be measured.

Surface conditions vary markedly from one application to another but often are found to be fairly consistent within a family of similar parts at the same stage of production.

Alignment of the surface normal with the incident beam is much more critical with specular reflection. Since the reflected beam is narrow and directional, a small variation in the tilt of the surface may cause the beam to completely miss the detector. It should be pointed out, however, that a disadvantage in one application may be an advantage in another. If the spatial orientation of a surface is critical, then specular reflection may be quite useful.

3. Other System Enhancements

In an improved system, the area of the illuminated disk 70 would be measured rather than its diameter. In this way, all available light would be utilized to improve the signal to noise ratio and to improve precision.

An advantage that arises from the coaxial arrangement of the light beam 28 and the lens 52 is that the aspect ratio is non-directional. Therefore, grooves and/or slots may be randomly oriented on the surface of the object 40, and may still be properly interrogated. If the light beam 28 were not coaxial with the lens 52, but instead was located to one side of the lens 52, then to measure the bottom surface of a slot of least allowable width, the slot would have to be aligned with the plane including the optic axis of the lens 52 and the light beam.

The preferred embodiment of the noncontact gage may be enhanced to include multiple gage heads, all of which are operated through a single microcomputer. Rapid measurements of many features of one or more objects may be achieved in this manner.

For convenience in setting up and in performing measurements, an optional readout of the measurement may be provided at the gage head 20.

A portable system consisting of a lunch-box sized microcomputer and a gage head may be provided for field use, for servicing several stations where noncontact measurements are required, and for general purpose measurement application, including training.

With a suitable interface and programming, two noncontact gages may be combined in a differential configuration for measurement of thickness, slope and so on.

A hand held noncontact gaging system of moderate performance may be realized by employing an edge-emitting light emitting diode for the source, and surface mount devices for the associated electronics. Where a compact form of the system 10 of FIG. 1 is desired, other modifications and simplifications can be made, e.g., the lens 52 and the mirror 58 can be replaced by a curved mirror (not shown) that combines focusing and reflecting functions to receive reflected light from the illuminated area 50 and to focus it along a path that is intercepted by a detector 60.

As will be apparent from the foregoing description, the present invention provides a highly versatile noncontact gage system that may be employed to measure dimensional and geometrical features of a wide variety of objects, particularly manufactured parts. Principal features of the measuring system include the speed at which the system can function to take measurements, and a capability to utilize interchangeable lenses and the like to interrogate any of a wide variety of object features. By utilizing a microcomputer to receive data generated by the gage, and/or to control relative positioning of the gage and the object being inspected, a highly automated system can be provided that will make rapid determinations as to conformance of inspected objects with desired values; moreover, a microcomputer can use the data that is received from the gage system of the present invention to decide the nature of any further machining that should be performed, and can even control the performance of such machining, preferably by utilizing gage systems of the present invention to monitor such machining as it takes place.

Although the invention has been described in its preferred form with a certain degree of particularity, it will be understood that the present disclosure of the preferred form has been made only by way of example, and that numerous changes in the details of construction and the combination and arrangements of parts and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A noncontact gaging system for ascertaining information about features of an object, comprising:
   (a) light source means for directing light along an optical path from the light source means onto selected surface portions of an object wherein the selected surface portions lie within a predetermined range of measurement, and for forming an illuminated area on said selected surface portions with the illuminated area being of circular shape, with the illuminated area being of relatively small size, and with the illuminated area retaining an essentially constant diameter over a range of measurement;
   (b) optical means for receiving a cone of light that has been reflected along an axis from the illuminated area, and for directing received light along a path to converge toward a real optical image or diverge from a virtual image, said optical means having a front focal plane, and,
   (c) light sensitive detector means disposed along said path at a point in fixed relation to said optical means and unrelated to any one image plane from said light for intercepting received non-imaged and unfocussed light that has been directed along the path by the optical means and for providing an output signal that has been derived at least in part from information of the angular spread of light at said focal plane provided by the intercepted light, and that is representative of a characteristic of said selected surface portions of the object.

2. The noncontact gaging system of claim 1, wherein:
   (a) the light sensitive detector means includes structure defining a light sensitive detector surface, and support means for positioning the detector surface along said path in a position that intercepts at least a portion of the received light that has been directed along said path by the optical means, with the intercepted light forming an illuminated spot on the detector surface, and with the detector surface being of sufficient size that portions thereof extend beyond opposed side portions of the illuminated spot; and, (b) the light sensitive detector means is operable to provide an output signal that is representative of the distance between said opposed side portions of the illuminated spot, whereby the output signal is representative of said characteristic of said selected surface portions of the object.

3. The noncontact gaging system of claim 2 wherein the support means is operable to position the light sensitive detector surface in a plane that is substantially perpendicular to said path.

4. The noncontact gaging system of claim 2 additionally including positioning means having:

(a) a first means for supporting the light source means, the optical means, and the light sensitive detector means;

(b) a second means for supporting the object; and, (c) a third means for effecting relative movement of at least a selected part of the first and second means for causing said illuminated area to move relative to the object to scan the illuminated area across surface portions of the object.

5. The noncontact gaging system of claim 1, wherein the light sensitive detector means includes structure defining a detector surface that has an array of discrete light sensitive surface regions, with the detector means being operable to provide an output signal that is representative of whether intercepted light traveling along said path is incident upon the various light sensitive surface regions of the array.

6. The noncontact gaging system of claim 1, wherein:

(a) the light sensitive detector means includes structure defining a light sensitive detector surface that is at least as wide as is the received light that is directed along said path, and support means for positioning the detector surface across the beam path such that the detector surface intercepts at least a portion of the received light that has been directed along said path by the optical means, and such that the intercepted light illuminates a portion of the detector surface; and, (b) the light sensitive detector means is operable to provide an output signal that is representative of a dimension of said illuminated portion of the detector surface, whereby the output signal is representative of said characteristic of said selected surface portions of the object.

7. The noncontact gaging system of claim 6, wherein:

(a) the system additionally includes positioning means for causing the light source means to sequentially position the illuminated area on each of a plurality of selected surface portions of the object to sequentially interrogate said selected surface portions; and, (b) the detector means is operable to provide an output signal that changes over time in accordance with differences that are encountered in said characteristic as the illuminated area is sequentially positioned to sequentially interrogate said plurality of selected surface portions.

8. The noncontact gaging system of claim 6 wherein the optical means includes at least one lens that is positioned to focus received light along said path.

9. The noncontact gaging system of claim 8 wherein the optical means includes at least one additional lens that is substitutable for said at least one lens.

10. The noncontact gaging system of claim 9 additionally including means for facilitating the substitution of said one and additional lenses one for the other.

11. A noncontact gaging system for interrogating a plurality of selected surface portions for an object to ascertain information about at least one characteristic of the selected surface portions, the system comprising:

(a) light source means for directing light along an optical path from the light source means onto selected surface portions of an object wherein the selected surface portions lie within a predetermined range of measurement, and for forming an illuminated area on said selected surface portions that is of circular shape, that is of relatively small size, and that is of essentially constant diameter over the range of measurement;

(b) optical means for receiving a cone of light that has been reflected along an axis from the illuminated area, and for directing a beam of such reflected light along a path to converge toward a real optical image or diverge from a virtual image, said optical means having a front focal plane, and, (c) light sensitive detector means including a light responsive detector positioned along the path at a point in fixed relation to said optical means and unrelated to any one image plane from said light for intercepting the non-imaged and unfocussed beam of light from the optical means and for providing an electrical output signal (1) that has been derived at least in part from information of the angular spread of light at said focal plane provided by the intercepted light, (2) that is representative of at least one characteristic of the selected surface portions, and (3) that changes its character in accordance with differences in said characteristic that are encountered as light from the source means is directed sequentially onto the selected surface portions.

12. The noncontact gaging system of claim 11, wherein:

(a) the light sensitive detector means includes structure defining a light sensitive detector surface, and support means for positioning the detector surface along said path in a position that intercepts at least a portion of the beam of light that has been directed along the path by the optical means, with the intercepted light forming a spot of measurable size on the detector surface, and with the detector surface being of sufficient size that portions thereof extend beyond opposed side portions of the spot; and, (b) the light sensitive detector means is operable to provide an output signal that is representative of the distance between said opposed side portions of the spot, whereby the output signal is representative of said characteristic of said selected surface portions of the object.

13. The noncontact gaging system of claim 12, wherein the support means is operable to position the light sensitive detector surface in a plane that is substantially perpendicular to said path.

14. The noncontact gaging system of claim 11, wherein:

(a) the light sensitive detector means includes structure defining a light sensitive detector surface that is at least as wide as the beam of light that is directed along said path, and support means for positioning the detector surface across said path in a position that intercepts at least a portion of the beam of light that has been directed along said path by the optical means; and, (b) the light sensitive detector means is operable to provide an output signal that is representative of a dimension of said illuminated portion of the detector surface, whereby the output signal is representative of said characteristic of said selected surface portions of the object.

15. The noncontact gaging system of claim 11, wherein the optical means includes at least one lens that is positioned to receive said reflected light and to direct received reflected light along said path.

16. The noncontact gaging system of claim 15 wherein the optical means includes at least one additional lens that is substitutable for said at least one lens.

17. The noncontact gaging system of claim 16 additionally including means for facilitating the substitution of said one and additional lenses one for the other.

18. A noncontact gaging system, comprising:
(a) optical transmitter and receiver means:
 (i) for directing light along an optical path onto selected surface portions of an object wherein the selected surface portions lie within a predetermined range of measurement, for forming an illuminated area on said selected surface portions of the object, and for maintaining the illuminated area of essentially constant diameter over the range of measurement;
 (ii) for receiving a cone of light that is reflected from the illuminated area;
 (iii) for directing the reflected light along a path to converge toward a real optical image or diverge from a virtual image; and,
 (iv) for intercepting the non-imaged and unfocussed light that has been directed along the path at a point in fixed relation to said optical means and unrelated to any one image plane from said light so that the intercepted light forms an illuminated spot of measurable size on light sensitive detector means for providing a regularly pulsed electrical signal with pulses of the signal having a characteristic that is derived at least in part from information of the angular spread of light at a focal plane provided by the intercepted light and that is representative of a characteristic of the selected surface portions of the object; and,
(b) signal processor means for enhancing the electrical signal to provide a pulsed output signal that is representative of data that characterizes at least one feature of the object.

19. The noncontact gaging system of claim 18 wherein the optical transmitter and receiver means is operable to transmit light to and to receive reflected light from the object coaxially along a common optical path.

20. The noncontact gaging system of claim 19 wherein the optical transmitter and receiver means includes:
(a) at least one lens positioned along the common optical path for assisting in receiving and directing reflected light; and,
(b) light source means for directing a beam of light along the common optical path through the optical center of the lens to form said illuminated area on the object.

21. The noncontact gaging system of claim 20 wherein the optical transmitter and receiver means includes at least one alternate lens that is substitutable for said at least one lens, and housing means for protectively enclosing said alternate lens and said at least one lens.

22. The noncontact gaging system of claim 19 wherein the signal processor means includes:
(a) low pass filter means for receiving the electrical signal from the detector means and for deriving therefrom a first output signal that includes pulses that are representative of an amplified envelope of the electrical signal;
(b) peak follower means for receiving the electrical signal from the detector means and for deriving therefrom a second output signal that is representative of the peak value of the electrical signal; and,
(c) comparator means for receiving the first and second output signals and deriving therefrom said pulsed output signal, with pulses therein having a duration that is equal to the time during which the first output signal is greater in value than the second output signal.

23. The noncontact gaging system of claim 22 wherein the low pass filter means additionally is operable to provide pulses of the first output signal that each are delayed in time relative to pulses of said electrical signal.

24. The noncontact gaging system of claim 23 wherein the amplitude of the envelope of the pulses of the first output signal is a fixed ratio of the maximum amplitude of the pulses of the electrical signal.

25. The noncontact gaging system of claim 24 wherein the fixed ratio is equal to about "two."

26. The noncontact gaging system of claim 22 additionally including means for delaying the pulses of the first signal relative to the pulses of the electrical signal, with the extent of the delay of each pulse of the first output signal being sufficient to enable the amplitude of the pulses of the second output signal to stabilize at their peak values.

27. A method of ascertaining information about features of an object, comprising the steps of:
(a) directing light onto selected surface portions of an object wherein the selected surface portions lie within a predetermined range of measurement to form an illuminated area thereon that is of circular shape, and that is maintained of essentially constant diameter over the range or measurement;
(b) directing light that is reflected as a cone of light from the illuminated area as by utilizing optical means to receive the cone of light to form a beam of light traveling along a path to converge toward a real optical image or diverge from a virtual image, said optical means having a front focal plane,;
(c) positioning a light responsive detector along the path at a point in fixed relation to said optical means and unrelated to any one image plane from said light to intercept non-imaged and unfocussed light that is directed along the path by the optical means; and,
(d) operating the light responsive detector to obtain an output signal that has been derived at least in part from information as to the angular spread of light at said focal plane provided by the intercepted light, and that is representative of a characteristic of the selected surface portions of the object.

28. The method of claim 27, wherein:
(a) the light responsive detector includes structure defining a light sensitive detector surface, and the step of positioning the light responsive detector includes positioning the detector surface along said path in a position that intercepts at least a portion of the light that has been directed along the path by the optical means, with the intercepted light forming a spot of measurable size on the detector surface, and with the detector surface being of sufficient size that portions thereof extend beyond opposed side portions of the spot; and, (b) the step of operating the detector includes operating the detector to obtain an output signal that is representative of the distance between said opposed side portions of the spot, whereby the output signal is representative of said characteristic.

29. The method of claim 27 wherein:
(a) the step of providing a detector includes providing a detector having a detector surface that has an array of discrete light sensitive surface regions; and,
(b) the step of operating the detector includes operating the detector to provide an output signal that is representative of whether intercepted light traveling along said path is incident upon the various light sensitive surface regions of the array.

30. The method of claim 27, wherein the step of operating the detector includes the steps of:
(a) providing a detector having a light sensitive detector surface, and positioning the detector surface along the path in a position that intercepts at least a portion of the light that has been directed along the path by the optical means, with the intercepted portion extending the full width of the beam of light that is traveling along said path, whereby a portion of the detector surface that is of measurable dimension is illuminated by the intercepted light; and,
(b) providing an output signal from the detector that is representative of a dimension of said illuminated portion of the detector surface, whereby the output signal is representative of said characteristic.

31. The method of claim 27, wherein:
(a) the step of directling light onto the object includes the step of effecting relative movement of the object and the illuminated area of light that is directed onto the object, so as to cause such illuminated area to sequentially illuminate each of a plurality of selected surface portions of the object; and,
(b) the step of operating the detector includes operating the detector to provide an output signal that changes over time in accordance with differences that are encountered in said characteristic as the illuminated area is sequentially positioned to interrogate said plurality of selected surface portions.

32. The method of claim 27 wherein the step of directing light along the path includes the step of positioning at least one lens that is positioned to receive said reflected light and to focus received reflected light along said path.

33. A method of interrogating a plurality of selected surface portions of an object to ascertain information about at least one characteristic of the selected surface portions, comprising the steps of:
(a) directing light through optical means having a front focal plane sequentially onto selected surface portions of an object wherein the selected surface portions lie within a predetermined range of measurement with the light being directed so as to form an illuminated spot on the selected surface portions that is of circular shape, that is of relatively small size, and that is maintained of essentially constant diameter over the range of measurement;
(b) directing a portion of the light that is reflected as a cone of light from the illuminated spot to provide a beam of light traveling along a path to converge toward a real optical image or diverge from a virtual image,;
(c) positioning a light responsive detector along the path at a point in fixed relation to said optical means and unrelated to any one image plane from said light to intercept non-imaged and unfocussed reflected light that is directed along the path; and,
(d) operating the light responsive detector to obtain an output signal that has been derived at least in part from information as to the angular spread of light at said focal plane provided by the intercepted light having a signal characteristic that is representative of at least one characteristic of the selected surface portions, with the signal characteristic changing as differences in the characteristic of the selected surface portions are encountered as the illuminated spot of essentially constant diameter is directed sequentially onto the selected surface portions.

34. The method of claim 33 wherein:
(a) the step of operating the detector includes the step of providing a light sensitive detector that has a light sensitive detector surface;
(b) the step of positioning the detector includes the step of positioning the detector surface along said path in a position that intercepts at least a portion of the reflected light that has been directed along said path, with the intercepted light forming a spot of measurable size on the detector surface, and with the detector surface being of sufficient size that portions of the detector surface extend beyond opposed side portions of the spot; and,
(c) the step of operating the detector includes operating the detector to obtain an output signal that is representative of the distance between said opposed side portions of the spot, whereby the output signal is representative of said characteristic of said selected surface portions of the object.

35. The method of claim 34, wherein:
(a) the step of positioning the detector along the path includes positioning a light sensitive detector surface so that it intercepts at least a portion of the light that has been directed along the path by the optical means, with the intercepted portion extending the full width of the beam of light that is traveling along said path, whereby a portion of the detector surface that is of measurable dimension is illuminated by the intercepted light; and,
(b) the step of operating the detector includes the step of operating the detector to provide an output signal that is representative of a dimension of said illuminated portion of the detector surface, whereby the output signal is representative of said characteristic.

* * * * *